March 7, 1939. W. R. SCHLAGE Re. 21,025

METAL DOOR REINFORCEMENT AND LOCK MOUNTING

Original Filed June 14, 1932 4 Sheets-Sheet 1

INVENTOR.
Walter R. Schlage.
BY
Townsend & Loftus.
ATTORNEYS.

March 7, 1939. W. R. SCHLAGE Re. 21,025

METAL DOOR REINFORCEMENT AND LOCK MOUNTING

Original Filed June 14. 1932 4 Sheets-Sheet 2

INVENTOR.
Walter R. Schlage.

BY Townsend and Loftus.
ATTORNEYS.

METAL DOOR REINFORCEMENT AND LOCK MOUNTING

Original Filed June 14, 1932 4 Sheets-Sheet 3

INVENTOR.
Walter R. Schlage.

BY Townsend & Loftus.
ATTORNEYS.

March 7, 1939. W. R. SCHLAGE Re. 21,025

METAL DOOR REINFORCEMENT AND LOCK MOUNTING

Original Filed June 14, 1932 4 Sheets-Sheet 4

INVENTOR.
Walter R. Schlage.
BY Townsend & Loftus
ATTORNEYS.

Reissued Mar. 7, 1939

Re. 21,025

UNITED STATES PATENT OFFICE 21,025

METAL DOOR REINFORCEMENT AND LOCK MOUNTING

Walter R. Schlage, Palo Alto, Calif., assignor to Schlage Lock Co., San Francisco, Calif., a corporation of California Original No. 2,004,510, dated June 11, 1935, Serial No. 617,118, June 14, 1932. Application for reissue January 20, 1939, Serial No. 252,050

20 Claims. (Cl. 292—337)

This invention relates to a metal door reinforcement and lock mounting.

In many building structures, which are fireproof throughout, metal doors are employed. Such doors are usually built up from sheet metal and include a metal panel and a surrounding hollow sheet metal stile. Doors of this character require door locks and these can only be inserted by punching, drilling, or otherwise providing openings for the insertion of the locks. Openings thus formed weaken the sheet metal stile of the door and the sheet metal is, furthermore, so thin that a rigid anchor or securing means for the lock after it has been inserted is difficult to obtain.

The object of the present invention is to generally improve and simplify the construction and operation of structures of the character described; to provide a simple method of reinforcing and strengthening that portion of the stile in which the lock is inserted; to provide means whereby the lock may be rigidly supported and secured with relation to the reinforcement and the stile; and further, to provide means whereby the lock can be removed from the inside of the door only.

The invention is shown by way of illustration in the accompanying drawings, in which—

Figure 1:
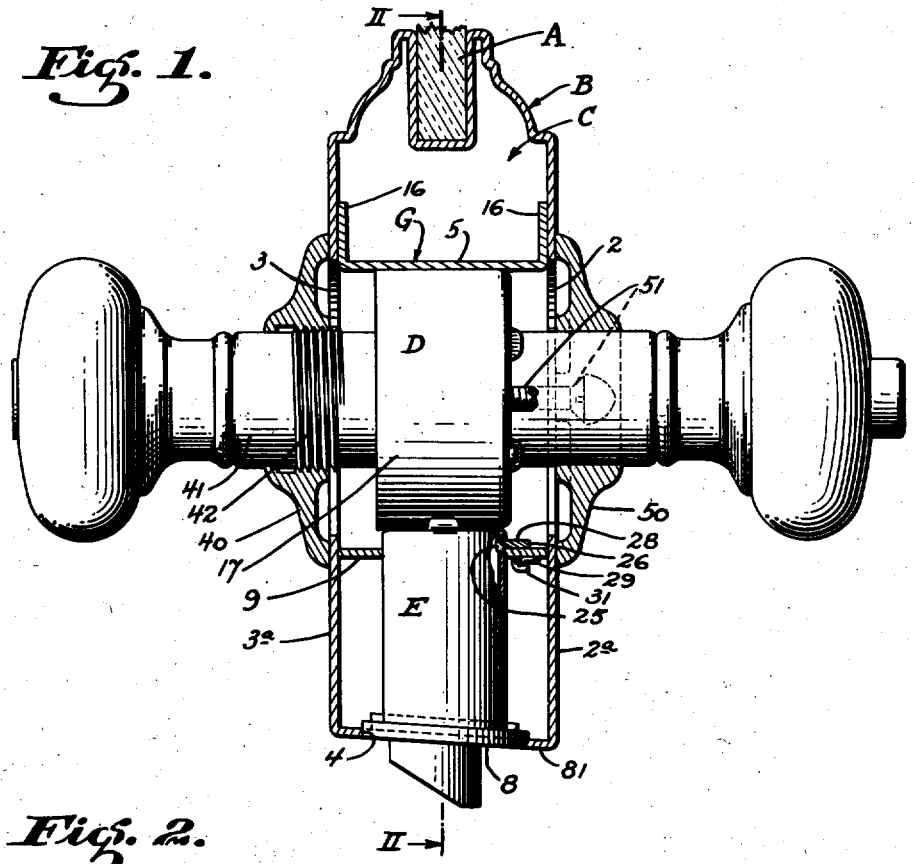
Fig. 1 is a horizontal section of a metal door showing the lock mechanism inserted therein.
Figure 2:
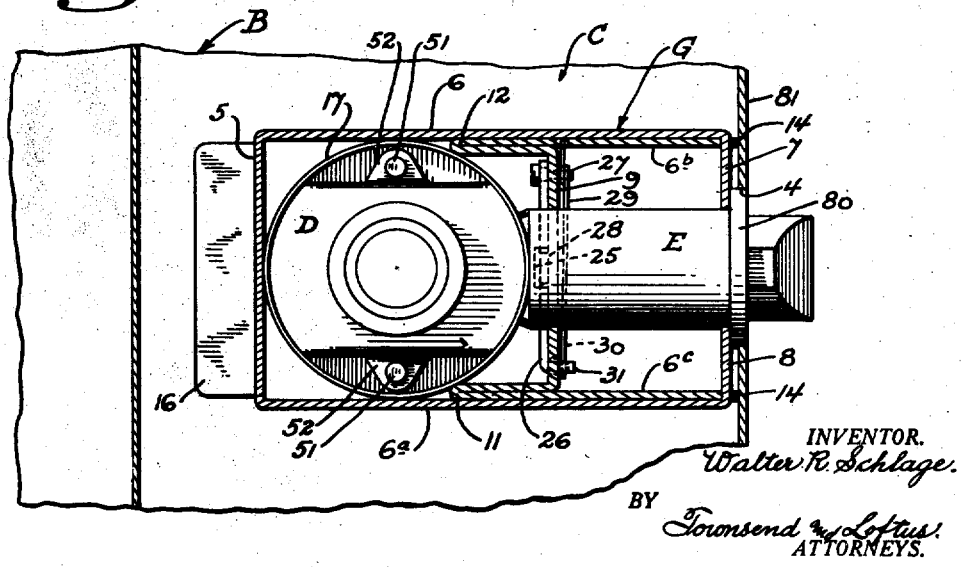
Fig. 2 is a vertical section taken on line II—II, said section showing the lock mechanism in full.
Figure 3:
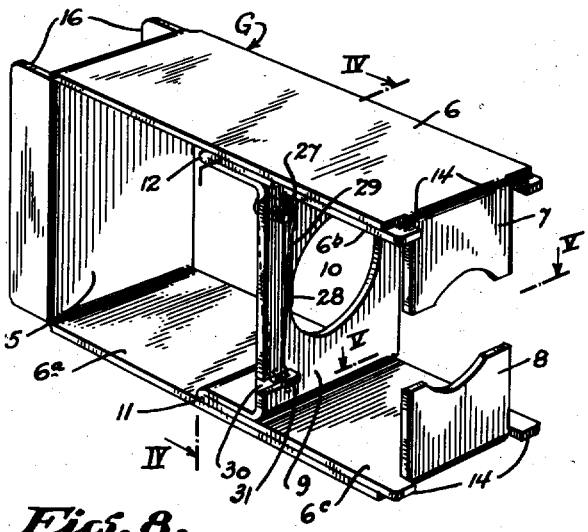
Fig. 3 is a perspective view of the reinforcing member inserted within the stile of the door.

Referring to the drawings in detail, and particularly Figs. 1 to 3, inclusive, A indicates the panel of a metal door, and B the stile surrounding the same. The stile is, in most instances, constructed of sheet metal and as such presents a hollow interior or space C for the reception of the mechanism of a door lock.

Figure 6:
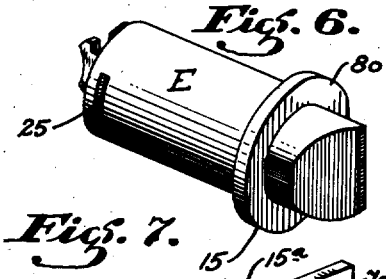
Figs. 6 and 7 show two different forms of latch bolt units adapted for insertion in a door of this character.
Figure 7:
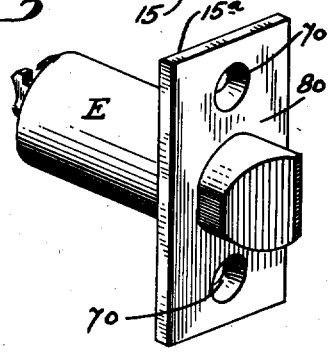
Figure 11:
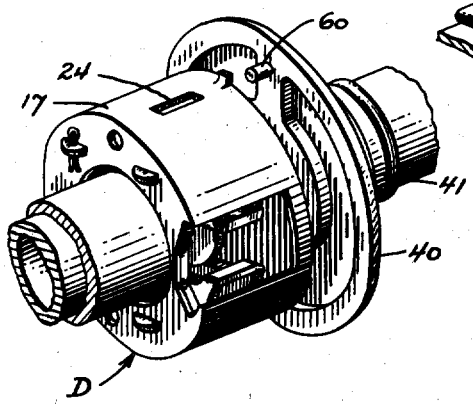
Fig. 11 is a perspective view of the latch actuating unit.

The door lock illustrated in the present instance comprises a latch bolt actuating unit D and a latch bolt unit E. Two forms of the latch bolt unit are illustrated in Figs. 6 and 7, and one form of the actuating unit is shown in Fig. 11. Openings, such as indicated at 2, 3 and 4, must be formed in the stile to permit insertion of the two units forming the door lock. The openings 2 and 3 are formed by drilling or punching the inner and outer faces 2*a* and 3*a* of the stile. The openings must be fairly large to permit endwise insertion of the latch actuating unit D and, as the sheet metal forming the stile is a comparatively light gauge metal, and the openings are fairly large, the stile is materially weakened at this point and difficulty is also encountered in properly anchoring or securing the lock mechanism to the stile of the door.

One of the main features of the present invention is to provide a simple method of reinforcing and strengthening the stile at the point where the lock is inserted and in providing means for securing the lock after insertion. The method or means employed for reinforcing the stile is best illustrated in Figs. 1 to 3. The reinforcing member comprises a rectangular-shaped frame generally indicated at G, see Fig. 3. It consists of an end section 5, a top section 6, a bottom section 6*a*, and a pair of end sections 7 and 8. The sections 5, 6, 6*a*, 7 and 8 may be formed from a single piece of metal and bent to form the rectangular shape disclosed. The top and bottom sections 6 and 6*a* are tied together by the end section 5 and also by the intermediate section 9, in which is formed a central opening 10. The intermediate section is formed from another piece of metal and is bent back upon itself to form top and bottom sections 6*b* and 6*c*, which are welded, riveted, or otherwise secured to the top and bottom sections 6 and 6*a* so as to form a rigid integral frame structure. Shoulders 11 and 12 are formed on the intermediate section which cooperates with the end section 5 to form a guide and support for the latch actuating unit D, as will hereinafter be described. The forward ends of the sections 6b and 6c terminate in lugs, such as shown at 14, and these form a gauge or spacer between the edge of the stile and the reinforcing member, the space thus formed being provided for the reception of the end plates 15 and 15a formed on the respective latching units shown in Figs. 6 and 7. This feature will also be further described.

The several members forming the frame have a width equal to the spacing between the inner and outer faces 2a and 3a of the stile and as such form a reinforcement between the faces of the stile and, in addition thereto, a support for the lock mechanism and also an anchor means for said mechanism. The openings 2 and 3 formed in the opposite faces of the stile are sufficiently large to permit the latch bolt actuating unit D to be inserted, but they are not large enough to permit insertion of the reinforcing unit G. Hence this is inserted, and by means of the lugs 16 is welded in place, during manufacture of the door, and as such becomes a permanent part of the door structure.

Figure 8:
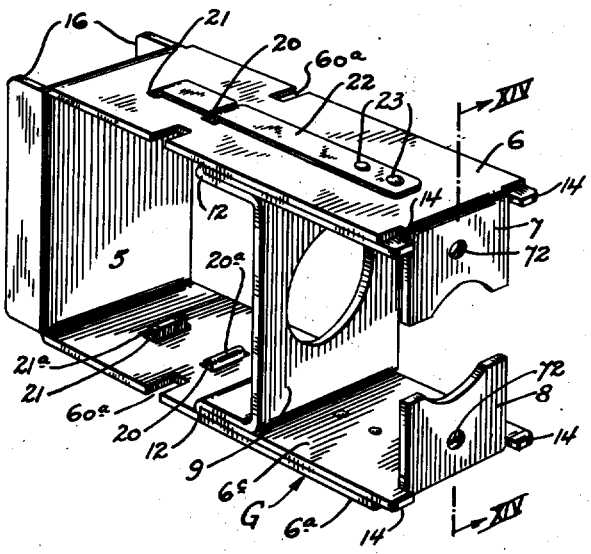
Fig. 8 is a perspective view showing a modified form of reinforcing member insertable in the door.

The opening 4 formed in the end face of the stile may be punched, drilled, or otherwise formed and it permits the insertion of the latch bolt unit E. In actual operation the reinforcing frame G is inserted and positioned as shown in Figs. 1 and 2. In this position the end plate 5 and the shoulders 11 and 12 align with the openings 2 and 3 so that when the latch actuating unit D is inserted the outer housing 17 of said unit will engage the shoulders and the end plate 5, as shown in Fig. 2. The shoulders, together with the end plate, thus guide the latch actuating unit while it is being inserted. They form a support therefor after insertion and they secure the latch actuating unit against longitudinal movement within the reinforcing frame. The latch actuating unit must also be secured against endwise removal when inserted and this is accomplished as follows:

Referring to Fig. 8, it will be noted that slots 20—20 and 21—21 are formed in the upper and lower sections 6 and 6a of the reinforcing frame, and further, that a pair of spring arms 22 are employed. One end of each spring arm is riveted or otherwise secured, as indicated at 23, while the opposite end is folded to form lugs 20a and 21a, the lugs 20a projecting through the slots 20 and the lugs 21a through the slots 21. By referring to Figs. 9 and 11, it will be noted that the housing 17 enclosing the latch actuating unit is provided with slots 24 and, when the latch unit is inserted, these slots will align with the lugs 20a thus permitting the lugs to enter the slots 24, as clearly shown in Fig. 9, and thereby lock or secure the latch actuating unit against endwise removal. The lugs indicated at 21a merely function as releasing members, for instance, if it is necessary at any time to remove the lock mechanism, a screw driver or the like may be inserted between the reinforcing frame and the housing 17. The lugs 21a may thus be engaged by means of the screw driver and depressed, and when they are depressed, lugs 20a are moved out of the slots 24 and the latch actuating unit can thus be removed.

Figure 4:
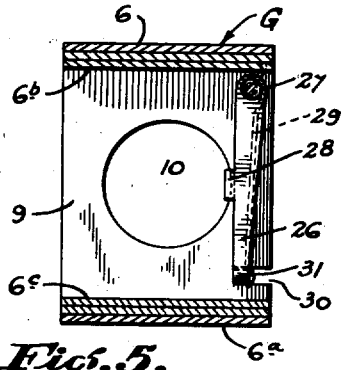
Fig. 4 is a cross section taken on line IV—IV of Fig. 3.
Figure 5:
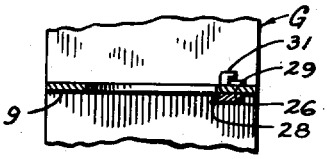
Fig. 5 is a plan section taken on line V—V of Fig. 3.
Figure 9:
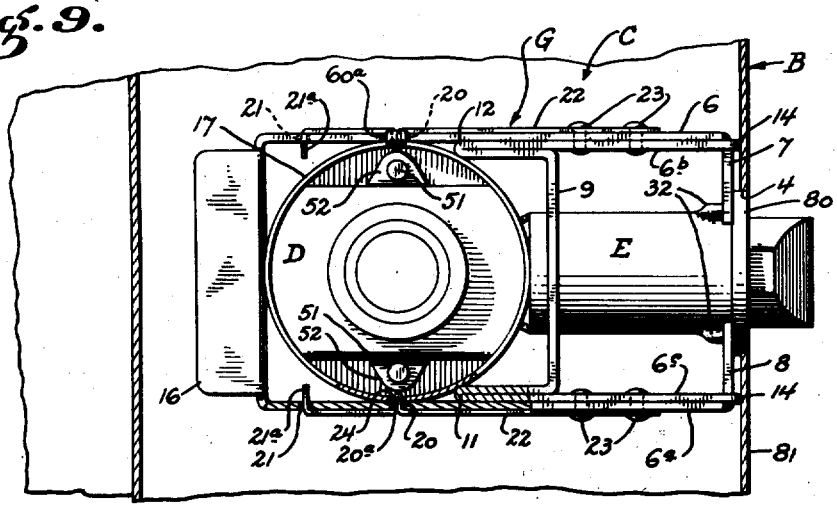
Fig. 9 is a section similar to Fig. 2, showing the insertion of the reinforcing member illustrated in Fig. 8.
Figure 10:
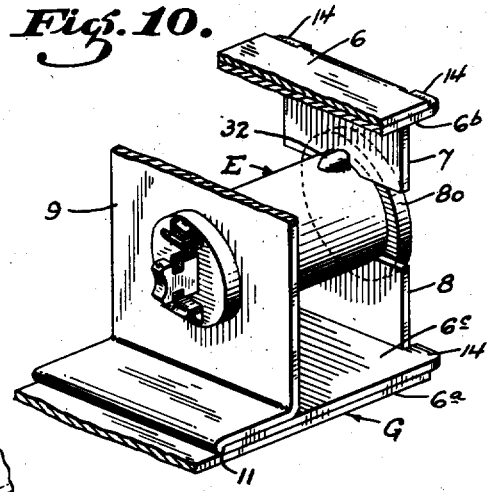
Fig. 10 is a perspective view of the forward end of the reinforcing member shown in Figs. 8 and 9, showing the manner in which the latch bolt housing is engaged and secured by the reinforcing member.

The latch bolt unit is secured in a similar manner. For instance, by referring to Fig. 6, it will be noted that a slot 25 is formed adjacent the inner end of the latch bolt housing. By referring to Figs. 2, 3 and 4, it will be noted that the intermediate section 9 of the reinforcing frame carries a latching lever 26. This lever is pivoted, as at 27, and its intermediate section carries a lug 28. The lever is actuated by a spring 29 which normally maintains the latching lever in the position shown in Figs. 3 and 4, this position being limited by a slot 30 and a lug 31 adapted to enter the same. When the latch bolt unit is inserted through the end opening 4 in the door, lug 28 enters the slot 25 and an interlock is thus made between the latch and the housing of the latch bolt unit which prevents endwise removal thereof. This latch may also be released when it is desired to remove the unit by merely inserting a screw driver or the like, and releasing the latching lever 26 against the spring tension; that is, a screw driver is brought into engagement with the lug 31 and by pushing thereon the lever is swung about its pivot 27, thus removing the lug 28 with relation to the slot 25. In this position of the latch, the latch bolt unit shown in Fig. 6 may be removed. Another method of securing the latch bolt unit is illustrated in Figs. 9 and 10. It will be noted that the end plate members 7 and 8 are separated. They are provided with rounded recesses to receive and guide the cylindrical housing of the latch bolt unit; that is, the rounded ends of the end plates 7 and 8 receive the outer end of the latch bolt unit E and the intermediate plate 9 receives the inner end. The latch bolt unit is thus supported at opposite ends within the reinforcing frame. Lugs, such as indicated at 32, may be formed on the latch bolt housing. The latch bolt housing, during insertion, is turned so that the lugs 32 will pass between the end plate sections 7 and 8 but, after insertion, the latch bolt unit is rotated until the lugs 32 swing behind the end plate sections 7 and 8, as clearly shown in Figs. 9 and 10. Hence, another method of securing the latch bolt unit against endwise removal is shown.

The methods of inserting, guiding, supporting and securing the respective units of the door lock have now been described. This, however, does not complete the installation of a door lock of this character as escutcheon plates must also be applied. By referring to Fig. 1, it will be noted that the outer escutcheon plate 40 is secured to the hub 41 of the latch actuating unit by means of a threaded connection 42. This is desirable as it permits endwise adjustment of the escutcheon plate with relation to the latch actuating unit D, such adjustment being necessary to permit the latch actuating unit to be positioned centrally of the stile. That is, stiles of different thickness are encountered, hence it is essential that the escutcheon plate 40 be adjustable to allow for such variations in thickness. When the latch actuating unit has been inserted and properly centered by means of the adjustable escutcheon plate 40, the second or inner escutcheon plate 50 may be applied. It is secured by screws, such as shown at 51, the screws extending through openings in the escutcheon plate and engaging threaded lugs 52 carried by the latch actuating unit. These lugs function as nuts and thus secure the escutcheon plate against endwise removal. The screws, furthermore, function as clamps to rigidly secure and clamp both the escutcheon plates and the lock mechanism in place.

The inner escutcheon plate is secured against rotational movement by means of the screws 51 and means are also provided for securing the outer escutcheon plate against rotation when adjusted, the means employed in the present instance being a pin 60, see Fig. 11. Slots 60a are formed in the opposite sides of the reinforcing frame, see Fig. 8. Pin 60 enters one or another of these slots, depending upon whether the installation is right or left hand, and as the pin extends into one of these slots the outer plate 40 will be secured against rotational movement and the lock can only be removed when the door is open and by first removing the inner escutcheon plate through release of the screws 51. Hence, if the door lock is key actuated, the door can only be opened by a person in possession of the proper key and the lock can not be removed, except by such a person, as it is essential that the door be opened before access is had to remove the inner escutcheon plate.

Figure 14:
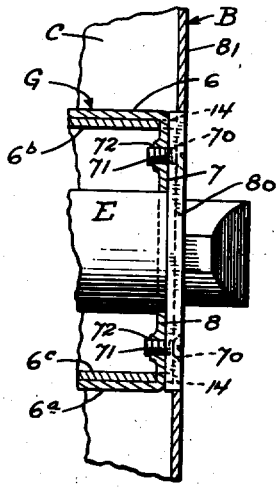
Fig. 14 is a vertical section taken on line XIV—XIV of Fig. 8, showing the type of latch bolt shown in Fig. 7 applied.
Figure 13:
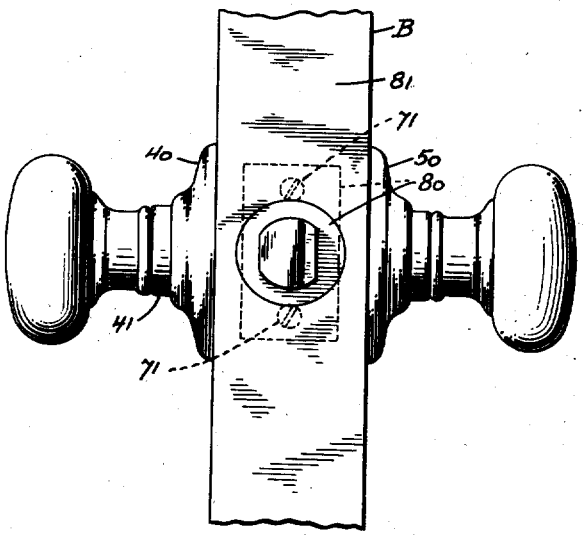
Fig. 13 is an edge view of the door shown in Fig. 9.

Two methods of securing the latch actuating unit, shown in Figs. 6 and 10, against endwise movement have been described. Another method of securing the latch bolt unit against removal is illustrated in Figs. 7 and 14. In this instance, the end plate of the latch bolt unit is shown as rectangular in shape and provided with screw receiving openings 70. Screws 71 are inserted in that instance and these engage threaded openings 72 formed in the end plates 7 and 8, see Fig. 8, hence it is possible to secure not only the latch actuating unit by means of the screws, such as shown at 51, but it is also possible to secure the latch bolt unit by means of screws, as shown at 71 in Fig. 14. The importance of providing the lugs 14 at the outer end of the reinforcing frame, see Figs. 2, 3 and 9, is as follows:

The end plate 80 of the latch actuating unit, see Figs. 6 and 7, should lie flush with the outer face 81 of the stile. The end plate 80 of the latch bolt actuating unit is fairly heavy, that is, it is thicker than the sheet metal forming the stile of the door. Hence, if the face 81 of the stile and the face 80 of the end plate of the latch bolt unit are to remain flush, the inner face of the end plates 80 must project beyond the inner face of the metal shown at 81. It is for this reason that the lugs 14 are provided. They determine the spacing and they maintain that space and they are, furthermore, of such a length that when the faces 80 and 81 are flush the inner face of the end plates 80 will engage the outer faces of the end plates 7 and 8 so as to be supported thereby. All parts of the lock mechanism are supported in this manner. Loose fits and play are thereby eliminated so as to prevent rattle and similar noises and great rigidity and strength are obtained.

Figure 12:
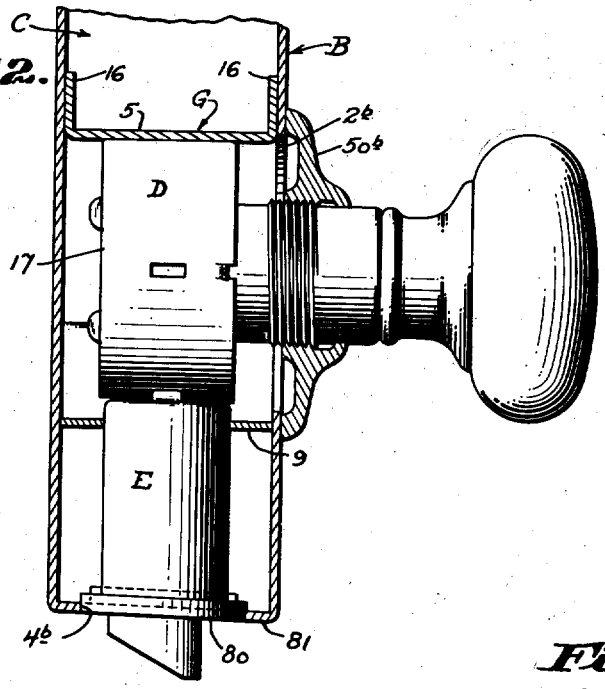
Fig. 12 is a section similar to Fig. 1, showing the type of lock employed in conjunction with closet doors where an inner knob is not required.

The description so far submitted relates to doors employing two knobs, an inner and an outer knob. Doors of this character require two escutcheon plates and opposed openings in the opposite faces of the stile for insertion and removal of the latch actuating unit. In Fig. 12 a door structure is shown which is particularly intended for closet doors and so on. In such installations, only one knob is required, hence it will be noted that only one opening is formed in the face of the stile, to-wit, that indicated at 2b, and one opening in the edge of the door, as indicated at 4b. The latch actuating unit D is inserted through the opening 2b and the latch bolt through the opening 4b. Means similar to those previously described are employed for securing the respective units with relation to the reinforcing member of the door, and as only one escutcheon plate is required, such as shown at 50b, this may be secured by providing a threaded connection between the same and the hub of the latch actuating unit.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In a door structure of the character described a latch bolt unit insertable through an opening in the edge of the door, and interlocking means formed between the latch bolt unit and the door structure, said means adapted to interlock by rotation of the latch bolt unit.

2. In a door structure of the character described a latch bolt unit insertable through an opening in the edge of the door, interlocking means formed between the latch bolt unit and the door structure, said means adapted to interlock by rotation of the latch bolt unit, and other means to secure the latch bolt unit against release by rotation after insertion of the latch bolt unit.

3. In a door structure of the character described, a latch bolt unit insertable through an opening in the edge of the door, a reinforcing frame disposed interiorly of the door adapted to receive and support the latch bolt unit, and means carried by the reinforcing frame for securing the latch bolt unit against endwise removal.

4. In a door structure of the character described, a latch actuating unit insertable through an opening formed in one face of the door, a reinforcing frame disposed interiorly of the door adapted to guide and support the latch actuating unit when inserted, and means carried by the reinforcing frame for securing the latch actuating unit against rotation and against endwise removal from the reinforcing frame.

5. In a door lock structure of the character described, a latch bolt unit insertable through an opening in the edge of the door, a latch actuating unit insertable through an opening in one face of the door, a reinforcing frame disposed interiorly of the door and adapted to receive and support the latch bolt unit and the latch actuating unit, and means on said frame to secure the respective units against removal.

6. In a door lock structure of the character described, a latch bolt unit insertable through an opening in the edge of the door, a latch actuating unit insertable through an opening in one face of the door, a reinforcing frame disposed interiorly of the door and adapted to receive and support the latch bolt unit and the latch actuating unit, and means on said frame to secure the respective units against removal, said means being releasable.

7. In a door structure of the character described, a latch bolt unit insertable through an opening in the edge of the door, a latch actuating unit disposed through an opening in one face of the door, a reinforcing frame secured interiorly of the door, and means carried by said frame to secure the latch actuating unit against rotation and endwise removal.

8. In a door structure of the character described, a latch bolt unit insertable through an opening in the edge of the door, a latch actuating unit disposed through an opening in one face of the door, a reinforcing frame secured interiorly of the door, means carried by said frame to secure the latch actuating unit against rotation and endwise removal, and other means carried by said frame for securing the latch bolt unit against endwise removal.

9. In a door having a hollow metal stile with openings formed therein for the insertion of a door lock, an elongated reinforcing frame secured between the inner faces of the stile, means at one end of the reinforcing frame forming a guide and support for the latch actuating unit of the door lock, means at the opposite end of the reinforcing frame forming a guide and support for the latch bolt unit of the door lock, and means for securing the respective units with relation to the reinforcing frame.

10. In a door having a hollow metal stile, a reinforcing frame disposed transversely between the inner faces of the stile and supporting the inner faces thereof, said frame being elongated and having a supporting plate intermediate its ends to receive and support the inner end of a latch bolt unit.

11. In a door having a reinforcing frame disposed transversely between the inner faces of the stile and supporting the inner faces thereof, a latch bolt unit insertable through an opening in the edge of the door and adapted to be received and supported by the reinforcing member, and spring actuated means forming an interlock between the latch bolt unit and the reinforcing member.

12. In a door having a reinforcing frame disposed transversely between the inner faces of the stile and supporting the inner faces thereof, a latch bolt actuating unit insertable through an opening formed in one face of the door and adapted to be received and supported by the reinforcing frame, and spring actuating means forming an interlock between the latch bolt actuating unit and the reinforcing frame.

13. In a door having a hollow metal stile, a door lock insertable through an opening formed in the stile, and means within the stile adapted to automatically interlock with the door lock during insertion of the same to secure the door lock against removal.

14. In a door having a hollow metal stile, a latch bolt unit insertable through an opening formed in the edge of the stile, and means within the stile adapted to automatically interlock with the latch bolt unit during insertion of the same to secure said unit against endwise removal.

15. In a door having a hollow metal stile, a latch bolt actuating unit insertable through an opening formed in the face of the stile, and means within the stile adapted to automatically interlock with the latch bolt actuating unit during insertion of the same to secure the latch bolt actuating unit against endwise removal.

16. In a door having a hollow metal stile, a reinforcing frame secured within the stile, a door lock mechanism insertable through an opening formed in the stile adapted to be received and supported by the reinforcing member, and means carried by the reinforcing member adapted to automatically interlock with the door lock and secure the door lock against removal.

17. In a door having a hollow metal stile, a lock casing insertable through an opening formed in the stile, and projectible and releasable means carried by the stile whereby an interlock is formed between the stile and the lock casing when the lock casing is inserted.

18. In a door having a hollow metal stile, a lock casing insertable through an opening formed in the stile, and resilient and releasable means carried by the stile whereby an interlock is formed between the stile and the lock casing when the lock casing is inserted.

19. In a door having a hollow metal stile a door lock insertable through an opening formed in the stile, and interlocking means carried by the door stile and adapted to engage the lock, said interlocking means permitting endwise insertion of the lock and preventing endwise removal of the lock when inserted.

20. In a door having a hollow metal stile a door lock insertable through an opening formed in the stile, and a lock securing device within the stile comprising means whereby a connection is formed between the lock and the stile upon insertion of the lock, said connection retaining the lock against removal from the stile.

WALTER R. SCHLAGE.